United States Patent Office 3,563,773
Patented Feb. 16, 1971

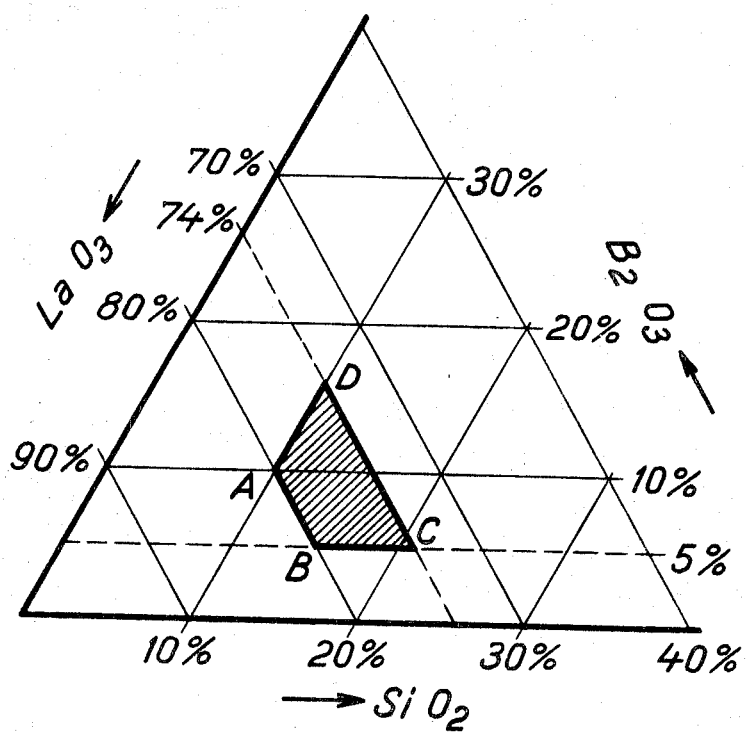

3,563,773
OPTICAL GLASS
Heinz Brömer, Hermannstein, and Norbert Meinert and Ernst Leitz, Wetzlar, Germany, assignors to Ernst Leitz, G.m.b.H., Wetzlar, Lahn, Germany
Continuation-in-part of application Ser. No. 563,867, July 8, 1966, which is a continuation-in-part of application Ser. No. 786,726, Jan. 14, 1959. This application May 29, 1969, Ser. No. 829,033
Claims priority, application Germany, Feb. 19, 1958, L 29,720, Patent 1,061,976
Int. Cl. C03c 3/08
U.S. Cl. 106—54         11 Claims

ABSTRACT OF THE DISCLOSURE

An optical glass is disclosed which consists essentially of (a) a glass base consisting of $B_2O_3$, $La_2O_3$ and $SiO_2$, (b) of $ZrO_2$ and $Ta_2O_5$, and (c) of at least one constituent selected from a group including the oxides and fluorides respectively of such metals as magnesium, calcium, barium, zinc, lead, aluminum, yttrium, titanium, niobium, and tungsten. The index of refraction of the invented glass ranges in dependence on the percentage of the individual components from 1.80 to 1.92 while the Abbé numbers are between 48 and 35.0.

---

Our present application is a continuation-in-part application of our copending application Ser. No. 563,867, filed July 8, 1966, in the United States Patent Office, which itself is a continuation-in-part application of our further copending application Ser. No. 786,726, filed Jan. 14, 1959, in the United States Patent Office, both of which applications are abandoned.

BACKGROUND AND SUMMARY OF THE INVENTION

The invention relates to an optical glass having a high index of refraction ($n_e$) and a relatively high Abbé number ($v_e$) and also having a high chemical resistance and stability, hardness and other properties requisite for an optical glass.

Although optical glasses having relatively high indices of refraction whose main constituents are lanthanum oxide ($La_2O_3$) and boric oxide ($B_2O_3$) are known, achievement of high indices of refraction by increasing the proportion of lanthanum oxide has been unsuccessful due primarily to the tendency of high lanthanum oxide-content glasses to devitrify. Secondarily, such glasses decrease the Abbé value markedly. Silica ($SiO_2$) has been used in very small proportions to stabilize the lanthanum oxide effect of devitrification.

It is the object of this invention to provide an optical glass overcoming such limitations having nevertheless extremely high proportions of lanthanum oxide together with relatively high proportions of boric oxide ($B_2O_3$) and silica (silicon dioxide) ($SiO_2$).

The glass of the present invention consists of 62.5 to 80% of a glass base of boric oxide ($B_2O_3$), silica ($SiO_2$) and lanthanum oxide ($La_2O_3$) in proportions lying within the boundary of the area outlined in the ternary diagram shown in the accompanying drawing. The balance of the glass consists of 5 to 12.5% of zirconium dioxide, of 7 to 18.5% of tantalum pentoxide, and of at least one of certain additives which may alter the index of refraction and Abbé number or may be useful in modifying other physical properties of the glass.

In addition, we have found that the sum of the glass former constituents of the glass base, namely silica and boric oxide should be in sum 12.5 to 21% of the total weight, and the modifying oxide portion of the glass base, namely the lanthanum oxide, should be within the range of 50 to 64% of the total weight.

Glasses made in accordance with this invention have indices of refraction ($n_e$) within the range of 1.80 to 1.92, having corresponding Abbé values ($v_e$) ranging between 48 and 35.0.

As shown in the accompanying drawing, the ternary diagram therein represents the range of the three components of the glass base. The points connecting the lines defining the area within which the glass bases of the invention are located are identified according to the following Table 1.

TABLE 1

| | Percent of weight of glass base | | |
|---|---|---|---|
| | Silica ($SiO_2$) | Boric oxide ($B_2O_3$) | Lanthanum oxide ($La_2O_3$) |
| Point: | | | |
| A | 10.0 | 10.0 | 80.0 |
| B | 15.0 | 5.0 | 80.0 |
| C | 21.0 | 5.0 | 74.0 |
| D | 10.0 | 16.0 | 74.0 |

As well understood in this art, the ternary diagram plot of the ranges of glass base weights by percent of the glass base which in turn, according to the invention, is within the range 62.5 to 80% of the total weight of the glass, is such that the determination of any two of the constituents inherently dictates the percentage of the remaining constituent. Thus, for example, if one were to use a glass base having 80% of lanthanum oxide and 10% of silica, the glass base must have 10% boric oxide. To the glass base so determined 5 to 12.5% of zirconium dioxide and 7 to 18.5% of tantalum pentoxide are added and, further, there is added at least one additional oxide or fluoride respectively, preferably in the ranges according to the following Table 2, which oxides and fluorides are in themselves well known in the glass art to have certain influencing effects on the optical and physical properties of the glass.

TABLE 2

| Constituents additional to the glass base | Percentage of total weight |
|---|---|
| Beryllium oxide (BeO) | 0–3 |
| Magnesium oxide (MgO) | 0–3 } |
| Magnesium fluoride ($MgF_2$) | 0–3 } |
| Calcium oxide (CaO) | } 0–3 |
| Calcium fluoride ($CaF_2$) | 0–3 } |
| Barium oxide (BaO) | 0–3 |
| Zinc oxide (ZnO) | 0–6 |
| Cadmium oxide (CdO) | 0–6 |
| Lead oxide (PbO) | 0–10 |
| Aluminum oxide ($Al_2O_3$) | 0–12.5 |
| Yttrium oxide ($Y_2O_3$) | 0–5 |
| Titanium dioxide ($TiO_2$) | 0–7.5 |
| Niobium pentoxide ($Nb_2O_5$) | 0–5 |
| Tungsten trioxide ($WO_3$) | 0–3 |
| Sodium aluminum fluoride ($Na_3AlF_6$) | 0–1.0 |

According to the invention glasses of desirable optical properties are achieved by the addition of at least one of constituents listed in Table 2 within the ranges indicated. However, special attention is drawn to the fact that of magnesium oxide and magnesium fluoride together only 0–3% of the total weight are to be added to the glass base. In like manner only a total of 0–3% of calcium oxide and of calcium fluoride together is to be present in the glass, and, further, the percentage of these constituents together with barium oxide is to remain well in the range of 0–3% as indicated in Table 2 by the brackets.

It will also be appreciated that for the convenience of the tabulation of the additional constituents we have indicated the value zero for those constituents which are not needed or desired for the glass chosen. Thus, as will be appreciated from the specific examples to be tabulated, infra, aluminum, yttrium, titanium, zirconium, are useful for improving hardness of the glasses. The heavy metal oxides, such as tungsten trioxide, tantalum pentoxide, niobium pentoxide, lead oxide, titanium dioxide, are useful for increasing the index of refraction. Thus in certain glass the combination of such metal oxides with the lanthanum oxide of the base contribute in combination to the higher indices of refraction achieved by this invention.

Further, as it will be appreciated to those skilled in this art, the difficulty of using one or more of the well known constituents for achieving certain desirable characteristics of a glass is inhibited or proscribed by the deleterious effect of the combinations with other constituents resulting in devitrification and other undesirable effects, such as chemical instability and poor machining properties.

For certain glass we have found that the use of the bivalent elements, as a fluoride, allows the glass to be melted substantially more easily. Such fluorides are calcium fluoride, barium fluoride, cryolite—also known as sodium aluminum fluoride. Yttrium oxide is also useful as an alternative to aluminum oxide and is especially advantageous when extreme value of the index of refraction and of the dispersion value (Abbé number) are needed.

We have found more particularly, according to the invention, that the addition of aluminum or yttrium oxide should be limited to a maxium of 12.5% by weight of the entire mixture.

DESCRIPTION OF THE PREFERRED EMBODIMENTS

In the following Table 3, we tabulate fifteen examples, of glasses made according to the invention, arranged generally to increase in the value of indices of refraction ($n_e$) of each starting with Example PKT31 having an index 1.850 and ending with Example PKT98 of 1.919. The tabulation is arranged such that the base constituents of oxides of silicon, boron and lanthanum are first listed at the top of the tabulation with values representing the percent of each of the constituents relative to the glass base and corresponding accordingly to such points as would be determined by the ternary diagram.

Immediately below such listing we tabulate the constituents first by the glass base portions and below that the additional constituents, each of which being represented by the percent of the total weight of the glass. Following the listing of the constituents we have included the index of refraction ($n_e$) for each example as well as the Abbé number ($\nu_e$). To better appreciate the relative proportions of the glass base relative to the total weight, we have provided such a value for each example as indicated by the row designated ΣGG. In addition the row identified as ΣGB represents the artimetic sum of the glass former portions of the glass base, namely the arithmetic sum of the percent by total weight of the oxides of silicon and boron for each example.

For illustration purposes, referring to Example 900/2, we prepared a batch formulation of the constituents listed in Table 3 of a total weight of 5 kg. Initially, the constituents are intimately mixed and thereafter melted in a platinum crucible at a temperature of 1300 to 1350° C. After fusion has been completed the temperature is raised to 1400° C. and the melt is refined while continuously stirring. The refining time for this step usually is 120 minutes. At the end of the refining period the furnace is shut off and the melt is cooled to a temperature of 1280° C. with continuous agitation. After that temperature has been reached cooling is coninued without agitation to a temperature about 1200° C. At this temperature the melt is poured into preheated molds and is cooled thereafter in the manner well known in this art.

In addition to the very high index of refraction of 1.900 and an Abbé value of 40.4, this example has the characteristic of a coefficient of expansion (commonly designated by $\alpha$) of $7.3 \times 10^{-6}$. The transformation point of this example of optical glass is 692° C., its softening point, 737° C., and a density of 5.53. For tempering the glass a temperature of 730° C. is preferred.

It may be noted that the lanthanum oxide in the glass base may range from 74% to 80%, and that as the lanthanum oxide increases the combined amounts of $SiO_2$ and $B_2O_3$ decreases. Also within the limits set by any percentage of lanthanum oxide, the $SiO_2$ will range between 10% and 21%, and that for any percentage of $SiO_2$ within any of these ranges decreases, a percentage of $B_2O_3$ within this range increases. The percentage of any one of the three constituents is, therefore, determined by the percentage of the other two. As the amount of the glass base in the total glass melt varies within the range of 62.5% to 80%, the amounts of $La_2O_3$, $SiO_2$ and $B_2O_3$ for any composition of the glass base decreases proportionately.

It is to be noted that optical glasses with extremely high values of refractive indices are achieved according to this invention with a relatively small portion of silica and boric oxide. Note the values of this portion of the glass as shown in Table 3 along row ΣGB. As can be appreciated from a study of Table 3, as the sum of these oxides is reduced, the greater must be the additional constituents taken from the group of aluminum, yttrium, tantalum and niobium oxides (listed within Table 2).

While the invention has been described in detail with reference to certain specific embodiments, various changes and modifications will become apparent to those skilled in the art.

TABLE 3

| | PKT31 | A77 | PKT41/Kr | PKT87 | PKT93 | PKT41 | PKT85 | A78 | PKT96 | A91 | Ah546 | 900/1 | 900/2 | St404 | PKT98 |
|---|---|---|---|---|---|---|---|---|---|---|---|---|---|---|---|
| $SiO_2$ | 10.0 | 11.6 | 10.0 | 12.6 | 12.6 | 10.0 | 12.6 | 12.9 | 13.1 | 13.6 | 13.4 | 13.3 | 13.4 | 13.2 | 13.1 |
| $B_2O_3$ | 10.0 | 11.9 | 10.0 | 10.6 | 10.6 | 10.0 | 10.6 | 9.4 | 11.0 | 11.2 | 11.9 | 10.4 | 11.9 | 11.8 | 11.0 |
| $La_2O_3$ | 80.0 | 76.5 | 80.0 | 76.8 | 76.8 | 80.0 | 76.8 | 77.7 | 75.9 | 75.2 | 74.7 | 76.3 | 74.7 | 75.0 | 75.9 |
| $SiO_2$ | 7.9 | 7.88 | 7.84 | 9.5 | 9.5 | 7.9 | 9.5 | 8.80 | 9.5 | 9.95 | 8.45 | 9.75 | 8.45 | 9.0 | 9.5 |
| $B_2O_3$ | 7.9 | 8.12 | 7.84 | 8.0 | 8.0 | 7.9 | 8.0 | 6.45 | 8.0 | 8.2 | 8.40 | 7.60 | 8.40 | 8.0 | 8.0 |
| $La_2O_3$ | 63.2 | 52.0 | 62.53 | 58.0 | 58.0 | 63.2 | 58.0 | 53.00 | 55.0 | 55.0 | 52.6 | 55.75 | 52.6 | 51.0 | 55.0 |
| $BeO$ | | | | | | | | 2.0 | | | | | | 2.0 | |
| $MgO$ | | | | | | | | | | | | | | | |
| $MgF$ | | 3.0 | | | | | | | | | | | | | |
| $CaO$ | | | | 2.0 | | | | | | | | | | | |
| $CaF_2$ | | | | | | | | | | | | | | | |
| $BaO$ | | | | | 2.0 | | | | | | | | | | |
| $BaF_2$ | | | | | | | | | | | | | | | |
| $ZnO$ | | 6.0 | | | | | | 0.85 | | 0.55 | 3.75 | 0.55 | 3.4 | 1.0 | |
| $CdO$ | | | | | | | | 2.90 | | | 0.75 | | 1.3 | 2.0 | |
| $PbO$ | | | | | | | 2.0 | | 5.0 | | | | | | |
| $Al_2O_3$ | 7.9 | | 2.84 | | | 2.9 | | | | | | | | | |
| $Y_2O_3$ | | | | | | | | | | | 0.25 | | 0.25 | | |
| $TiO_2$ | | | | | | | | | | | | | | 4.0 | 5.0 |
| $ZrO_2$ | 5.2 | 5.2 | 5.15 | 5.3 | 5.3 | 5.2 | 5.3 | 7.5 | 5.3 | 8.5 | 8.3 | 8.0 | 8.1 | 7.0 | 5.3 |
| $Ta_2O_5$ | 7.9 | 14.8 | 12.81 | 17.2 | 17.2 | 12.9 | 17.2 | 18.0 | 17.2 | 15.8 | 17.5 | 18.5 | 17.5 | 16.0 | 17.2 |
| $Nb_2O_5$ | | | | | | | | | | | | 2.0 | | | |
| $WO_3$ | | | | | | | | 0.5 | | | | | | | |
| $Na_3AlF_6$ | | | 0.99 | | | | | | | | | | | | |
| $n_e$ | 1.850 | 1.874 | 1.876 | 1.881 | 1.883 | 1.884 | 1.889 | 1.894 | 1.896 | 1.898 | 1.898 | 1.900 | 1.900 | 1.9098 | 1.919 |
| $\nu_e$ | 43.2 | 41.3 | 41.8 | 41.2 | 41.0 | 41.5 | 40.5 | 40.2 | 39.2 | 39.7 | 40.0 | 40.5 | 40.4 | 36.9 | 35.8 |
| ΣGG | 79.0 | 68.0 | 78.21 | 75.5 | 75.5 | 79.0 | 75.5 | 68.25 | 72.5 | 73.15 | 69.45 | 73.1 | 69.45 | 68.0 | 72.5 |
| ΣGB | 15.8 | 16.0 | 15.68 | 17.5 | 17.5 | 15.8 | 17.5 | 15.25 | 17.5 | 18.15 | 16.85 | 17.35 | 16.85 | 17.0 | 17.5 |

What is claimed is:

1. An optical glass having an index of refraction ($n_e$) within the range of about 1.850 and 1.920 and a corresponding Abbé value ($v_e$) between about 43.2 and 35.8 consisting essentially of a glass base consisting of $B_2O_3$, $La_2O_3$ and $SiO_2$ in relative amounts falling within the area ABCD of the ternary diagram of the accompanying drawing, of 5 to 12.5% of $ZrO_2$, 7 to 18.5% of $Ta_2O_5$ and at least one constituent of the group listed in Table 2 of the specification in amounts indicated in said table, the amount of said glass base being within the range of 62.5 to 80 percent of the total weight of the glass, the ratio of $La_2O_3$ versus $SiO_2$ plus $B_2O_3$ being within the range of 2.8 to 4 of the total weight of the glass with the amount of $La_2O_3$ ranging between 50-64%, the amount of $SiO_2$ ranging between 6.25-16.8%, and the amount of $B_2O_3$ ranging between 4-12.8% of said total glass weight, wherein the sum of said glass formers $SiO_2$ plus $B_2O_3$ totals 12.5 to 20.8%.

2. An optical glass having an index of refraction ($n_e$) of 1.850 and a corresponding Abbé value ($v_e$) of 43.2 consisting essentially of the following constituents each in percent of the total weight of the glass:

| | |
|---|---|
| $SiO_2$ | 7.9 |
| $B_2O_3$ | 7.9 |
| $La_2O_3$ | 63.2 |
| $Al_2O_3$ | 7.9 |
| $ZrO_2$ | 5.2 |
| $Ta_2O_5$ | 7.9 |

3. An optical glass having an index of refraction ($n_e$) of 1.874 and a corresponding Abbé value ($v_e$) of 41.3 consisting essentially of the following constituents each in percent of the total weight of the glass:

| | |
|---|---|
| $SiO_2$ | 7.88 |
| $B_2O_3$ | 8.12 |
| $La_2O_3$ | 52.0 |
| $MgF_2$ | 3.0 |
| $ZnO$ | 6.0 |
| $ZrO_2$ | 5.2 |
| $Ta_2O_5$ | 14.8 |

4. An optical glass having an index of refraction ($n_e$) of 1.876 and a corresponding Abbé value ($v_e$) of 41.8 consisting essentially of the following constituents each in percent of the total weight of the glass:

| | |
|---|---|
| $SiO_2$ | 7.84 |
| $B_2O_3$ | 7.84 |
| $La_2O_3$ | 62.53 |
| $Al_2O_3$ | 2.84 |
| $ZrO_2$ | 5.15 |
| $Ta_2O_5$ | 12.81 |
| $Na_3AlF_6$ | 0.99 |

5. An optical glass having an index of refraction ($n_e$) of 1.881 and a corresponding Abbé value ($v_e$) of 41.2 consisting essentially of the following constituents each in percent of the total weight of the glass:

| | |
|---|---|
| $SiO_2$ | 9.5 |
| $B_2O_3$ | 8.0 |
| $La_2O_3$ | 58.0 |
| $CaO$ | 2.0 |
| $ZrO_2$ | 5.3 |
| $Ta_2O_5$ | 17.2 |

6. An optical glass having an index of refraction ($n_e$) of 1.883 and a corresponding Abbé value ($v_e$) of 41.0 consisting essentially of the following constituents each in percent of the total weight of the glass:

| | |
|---|---|
| $SiO_2$ | 9.5 |
| $B_2O_3$ | 8.0 |
| $La_2O_3$ | 58.0 |
| $BaO$ | 2.0 |
| $ZrO_2$ | 5.3 |
| $Ta_2O_5$ | 17.2 |

7. An optical glass having an index of refraction ($n_e$) of 1.894 and a corresponding Abbé value ($v_e$) of 40.2 consisting essentially of the following constituents each in percent of the total weight of the glass:

| | |
|---|---|
| $SiO_2$ | 8.80 |
| $B_2O_3$ | 6.45 |
| $La_2O_3$ | 53.00 |
| $BeO$ | 2.0 |
| $ZnO$ | 0.85 |
| $CdO$ | 2.90 |
| $ZrO_2$ | 7.5 |
| $Ta_2O_5$ | 18.0 |
| $WO_3$ | 0.5 |

8. An optical glass having an index of refraction ($n_e$) of 1.896 and a corresponding Abbé value ($v_e$) of 39.2 consisting essentially of the following constituents each in percent of the total weight of the glass:

| | |
|---|---|
| $SiO_2$ | 9.5 |
| $B_2O_3$ | 8.0 |
| $La_2O_3$ | 55.0 |
| $PbO$ | 5.0 |
| $ZrO_2$ | 5.3 |
| $Ta_2O_5$ | 17.2 |

9. An optical glass having an index of refraction ($n_e$) of 1.898 and a corresponding Abbé value ($v_e$) of 39.7 consisting essentially of the following constituents each in percent of the total weight of the glass:

| | |
|---|---|
| $SiO_2$ | 9.95 |
| $B_2O_3$ | 8.2 |
| $La_2O_3$ | 55.0 |
| $ZnO$ | 0.55 |
| $ZrO_2$ | 8.5 |
| $Ta_2O_5$ | 15.8 |
| $Nb_2O_5$ | 2.0 |

10. An optical glass having an index of refraction ($n_e$) of 1.900 and a corresponding Abbé value ($v_e$) of 40.5 consisting essentially of the following constituents each in percent of the total weight of the glass:

| | |
|---|---|
| $SiO_2$ | 9.75 |
| $B_2O_3$ | 7.60 |
| $La_2O_3$ | 55.75 |
| $ZnO$ | 0.55 |
| $ZrO_2$ | 8.0 |
| $Ta_2O_5$ | 18.5 |

11. An optical glass having an index of refraction ($n_e$) of 1.919 and a corresponding Abbé value ($v_e$) of 35.8 consisting essentially of the following constituents each in percent of the total weight of the glass:

| | |
|---|---|
| $SiO_2$ | 9.5 |
| $B_2O_3$ | 58.0 |
| $La_2O_3$ | 55.0 |
| $TiO_2$ | 5.0 |
| $ZrO_2$ | 5.3 |
| $Ta_2O_5$ | 17.2 |

References Cited

UNITED STATES PATENTS

| | | | |
|---|---|---|---|
| Re. 21,175 | 8/1939 | Morey | 106—54X |
| 2,805,166 | 9/1957 | Löffler | 106—52 |
| 3,174,871 | 3/1965 | Geffcken et al. | 106—54 |

FOREIGN PATENTS

| | | | |
|---|---|---|---|
| 1,061,976 | 7/1959 | Germany | 106—54 |

HELEN M. McCARTHY, Primary Examiner

UNITED STATES PATENT OFFICE
CERTIFICATE OF CORRECTION

Patent No. 3,563,773      Dated February 16, 1971

Inventor(s) Heinz Bromer, Norbert Meinert, Ernst Leitz

It is certified that error appears in the above-identified patent and that said Letters Patent are hereby corrected as shown below:

Column 2 line 54 "$Na_2AlF_6$" should read -- $Na_3AlF_6$ --. Column 3, line 16, "fiuor" should read -- fluor- --; and line 51 "artimetic" should read -- arithmetic --. Column 4, line 15 "coninued" should read -- continued --. In TABLE 3 row 10, "MgF" should read -- $MgF_2$ --. In claim 1, line 3 "(Ye)" should read -- ($V_e$) --. In claim 11, line 6, "$B_2O_3$ --- 58.0" should read -- $B_2O_3$ --- 8.0 --.

Signed and sealed this 15th day of May 1973.

(SEAL)
Attest:

EDWARD M. FLETCHER, JR.
Attesting Officer

ROBERT GOTTSCHALK
Commissioner of Patents